(12) United States Patent
Lin

(10) Patent No.: US 7,724,454 B2
(45) Date of Patent: May 25, 2010

(54) LENS MODULE WITH FILTER FASTENING MEMBER

(75) Inventor: Mong-Tung Lin, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/690,040

(22) Filed: Mar. 22, 2007

(65) Prior Publication Data

US 2008/0123204 A1    May 29, 2008

(30) Foreign Application Priority Data

Nov. 27, 2006    (CN) .................. 2006 1 0201143

(51) Int. Cl.
*G02B 7/02* (2006.01)
(52) U.S. Cl. .................. 359/819; 359/822; 359/829
(58) Field of Classification Search ......... 359/819–823, 359/738, 739, 723, 829
See application file for complete search history.

(56) References Cited

U.S. PATENT DOCUMENTS

| 4,473,289 | A | * | 9/1984 | Wallace | 396/276 |
|---|---|---|---|---|---|
| 4,934,790 | A | * | 6/1990 | Hohenecker | 359/823 |
| 5,677,791 | A | * | 10/1997 | Yoshibe et al. | 359/554 |
| 5,835,289 | A | * | 11/1998 | Berry | 359/822 |
| 6,927,924 | B2 | * | 8/2005 | Ueyama | 359/738 |
| 7,149,039 | B2 | * | 12/2006 | Shimakura | 359/704 |
| 2002/0135887 | A1 | * | 9/2002 | Nomura et al. | 359/699 |
| 2007/0058072 | A1 | | 3/2007 | Lee | |

FOREIGN PATENT DOCUMENTS

| CN | 2307303 Y | 2/1999 |
|---|---|---|
| JP | 59-127986 A | 7/1984 |
| JP | 61-105519 A | 5/1986 |
| JP | 62-89920 A | 4/1987 |

\* cited by examiner

*Primary Examiner*—Mohammed Hasan
(74) *Attorney, Agent, or Firm*—Jeffrey T. Knapp

(57) ABSTRACT

An exemplary lens module includes a barrel, at least one lens, a filter and a ring-shaped fastening member. The barrel has an interior space defined therein, a retaining portion, and a threaded portion proximate to the retaining portion. The at least one lens is received in the interior space of the barrel. The filter is received in the retaining portion of the barrel. The ring-shaped fastening member has threads on an outer wall thereof and is threadedly engaged in the threaded portion so as to fasten the filter to the retaining portion of the barrel. A method for assembling the lens module is also provided.

6 Claims, 4 Drawing Sheets

LENS MODULE WITH FILTER FASTENING MEMBER

BACKGROUND

1. Technical Field

The present invention relates generally to lens modules, and more particularly to a lens module with a filter therein and a method for assembling the filter in the lens module.

2. Description of Related Art

With the ongoing development of microcircuitry and multimedia technology, imaging systems, including, e.g., still camera systems and video camera systems are now in widespread use or being combined with various electronic devices. Such imaging systems are needed to satisfy requirements of compactness, low cost, and excellent optical performance.

Lens modules are key components of the imaging systems. The lens module typically includes a barrel, lenses, spacers, an aperture and a filter. Recent lens modules also integrate auto focusing or zooming mechanisms therein. Assembling of the lens module usually follows a certain procedure to attach the lenses, the spacers, the aperture and finally the filter to the barrel. Generally, UV-cured glue is used for attaching the filter. However, adhesive power of the glue may decrease over time, so the filter is not securely attached to the barrel. Furthermore, UV cut filters will block UV light, and the glue may not be fully cured during exposure to the UV light, i.e., bonding force between the filter and the barrel may be insufficient.

What is needed, therefore, is a lens module which overcomes the above-mentioned problems.

What is also needed is a method for assembling the lens module.

SUMMARY

In a preferred embodiment, an exemplary lens module includes a barrel, at least one lens, a filter and a ring-shaped fastening member. The barrel has an interior space defined therein, a retaining portion, and a threaded portion proximate to the retaining portion. The at least one lens is received in the interior space of the barrel. The filter is received in the retaining portion of the barrel. The ring-shaped fastening member has threads on an outer wall thereof and is threadedly engaged in the threaded portion so as to fasten the filter to the retaining portion of the barrel.

In another preferred embodiment, an exemplary method for assembling a lens module including steps of: disposing the at least one lens in the interior space; placing the filter into the retaining portion; and threadedly engaging the fastening member in the threaded portion so as to fasten the filter to the retaining portion of the barrel.

In further another preferred embodiment, an exemplary lens module includes a barrel, at least one lens, a filter and a ring-shaped fastening member. The barrel has an interior space defined therein and a threaded portion. The at least one lens and the lens are received in the interior space of the barrel. The ring-shaped fastening member has threads on an outer wall thereof and is threadedly engaged in the threaded portion so as to fasten the lens and the filter to the barrel.

Other advantages and novel features of the present invention will become more apparent from the following detailed description of preferred embodiment when taken in conjunction with the accompanying drawings.

BRIEF DESCRIPTION OF THE DRAWINGS

Many aspects of the lens module and the method can be better understood with reference to the following drawings. The components in the drawing are not necessarily drawn to scale, the emphasis instead being placed upon clearly illustrating the principles of the present lens module and method. Moreover, in the drawings, like reference numerals designate corresponding parts throughout the several views.

DETAILED DESCRIPTION OF THE PREFERRED EMBODIMENTS

Embodiments of the present lens module and method will now be described in detail below and with reference to the drawings.

Figure 1:
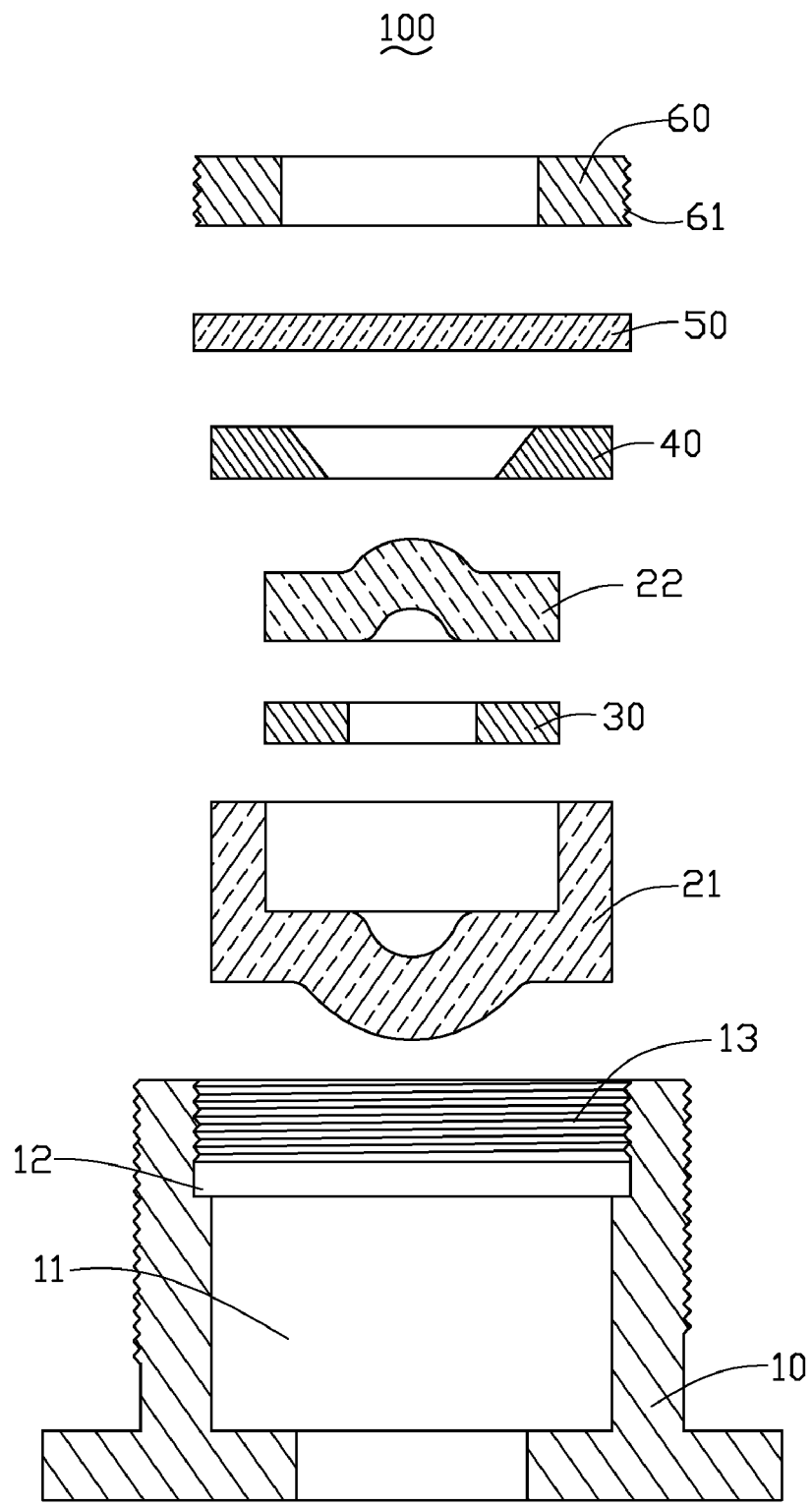
FIG. 1 is an exploded view of a lens module according to a first preferred embodiment of the present invention.
Figure 2:
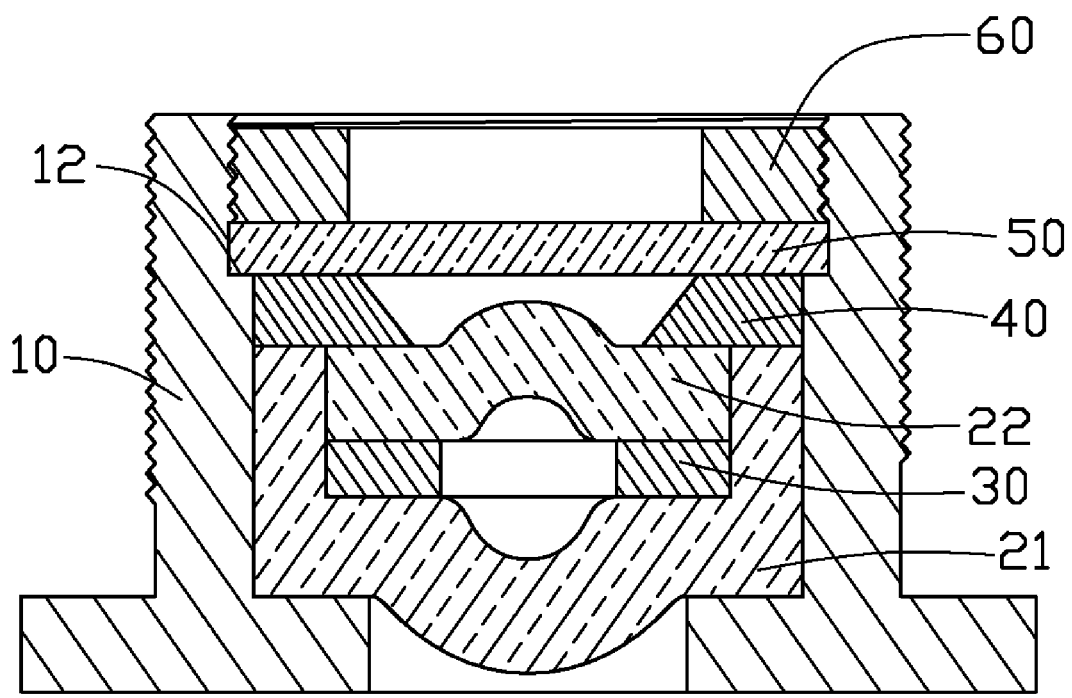
FIG. 2 is an assembled view of the lens module in FIG. 1.

Referring to FIGS. 1 and 2, an exemplary lens module 100 according to a first preferred embodiment includes a barrel 10, and a first lens 21, a second lens 22, an aperture member 30, a spacer 40, a filter 50 and a ring-shaped fastening member 60 received in the barrel 10.

The barrel 10 has threads on an outer wall thereof, thus facilitating linking with external apparatuses such as a holder for an image sensor. The barrel 10 has an interior space 11 defined therein, a retaining portion 12 proximate to the interior space 11, and a threaded portion 13 proximate to the retaining portion 12. The whole barrel 10 is cylinder-shaped. The interior space 11 has a constant inner diameter. An inner diameter of the retaining portion 12 is larger than that of the interior space 11.

The first and second lenses 21, 22 each can be made of plastic or glass and have a spherical or aspherical shape. The aperture member 30 is defined between the first lens 21 and the second lens 22, and is configured (i.e. structured and arranged) for controlling incident light and also spacing the first lens 21 and the second lens 22 apart. The spacer 40 is configured for spacing the second lens 22 and the filter 50 apart. The first lens 21, the second lens 22, the aperture member 30 and the spacer 40 are received in the interior space 11 of the barrel 10.

The filter 50 can be selected from IR cut filter, UV cut filter or UV-IR cut filter according to requirements. The filter 50 is placed into the retaining portion 12.

The fastening member 60 has threads 61 on an outer wall thereof. The fastening member 60 and the barrel 10 can be made of the same material, such as metal or plastic. The fastening member 60 is threadedly engaged in the threaded portion 13 of the barrel 10 and contacts the filter 50, thereby fastening the filter 50 to the retaining portion 12. Preferably, an adhesive such as glue (not shown) is applied between the threaded portion 13 and the outer wall of the fastening member 60 so as to secure the fastening member 60 in position.

A method for assembling the lens module 10 may include steps as follows:

(1) overlaying the first lens 21, the aperture member 30, the second lens 22 and the spacer 40 one by one into the interior space 11 of the barrel 10;

(2) placing the filter 50 into the retaining portion 12 of the barrel 10;

(3) threadedly engaging the fastening member 60 in the threaded portion 13 of the barrel 10; and (4) applying an adhesive to a periphery of the fastening member 60.

Due to the overlaying of all the above mentioned elements of the lens module 10, the precise optical elements including the first and second lens 21, 22 and the filter 50 can avoid using glue curing, thereby avoiding pollution and shortening the assembling time.

Figure 3:
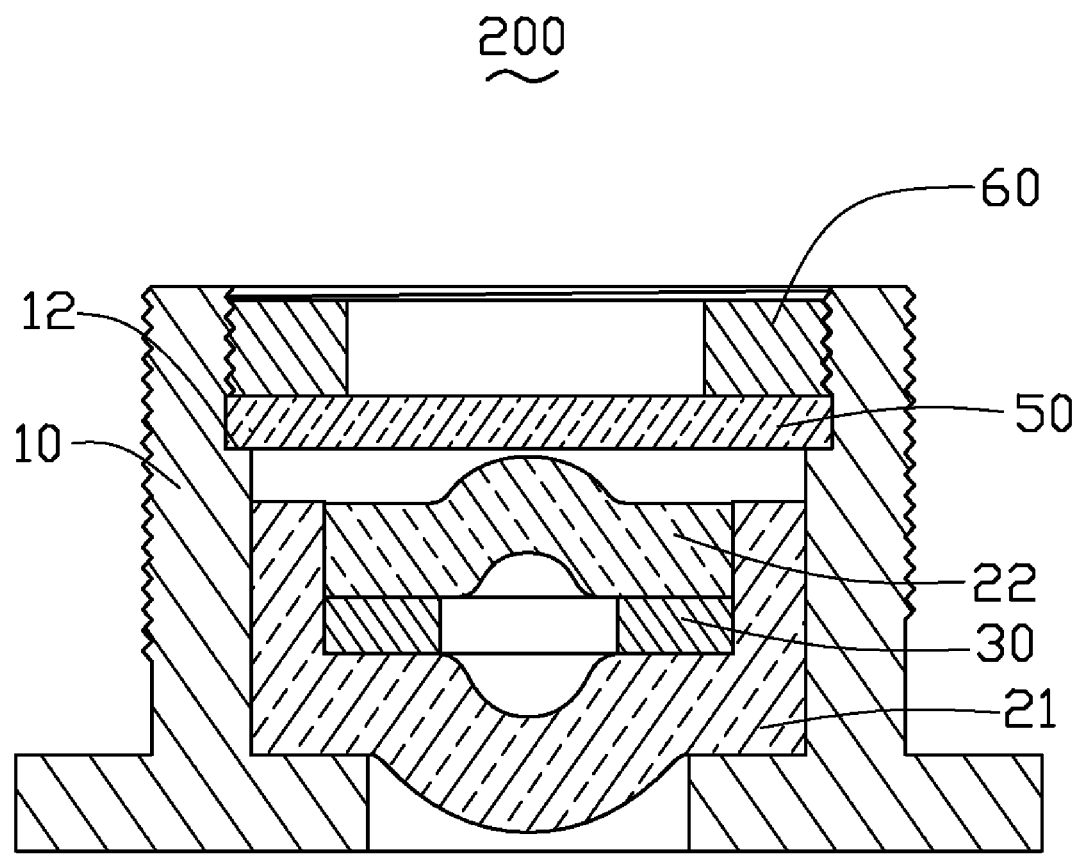
FIG. 3 is an assembled view of a lens module according to a second preferred embodiment of the present invention.

FIG. 3 shows an exemplary lens module 200 according to a second preferred embodiment. The lens module 200 is essentially similar to the lens module 100 illustrated in the first preferred embodiment, however, the spacer 40 is omitted, and an adhesive (not shown) is applied to a periphery of the first and second lens 21, 22 so as to attach the first and second lens 21, 22 in position. The filter 50 in the present embodiment can also avoid using glue curing.

Figure 4:
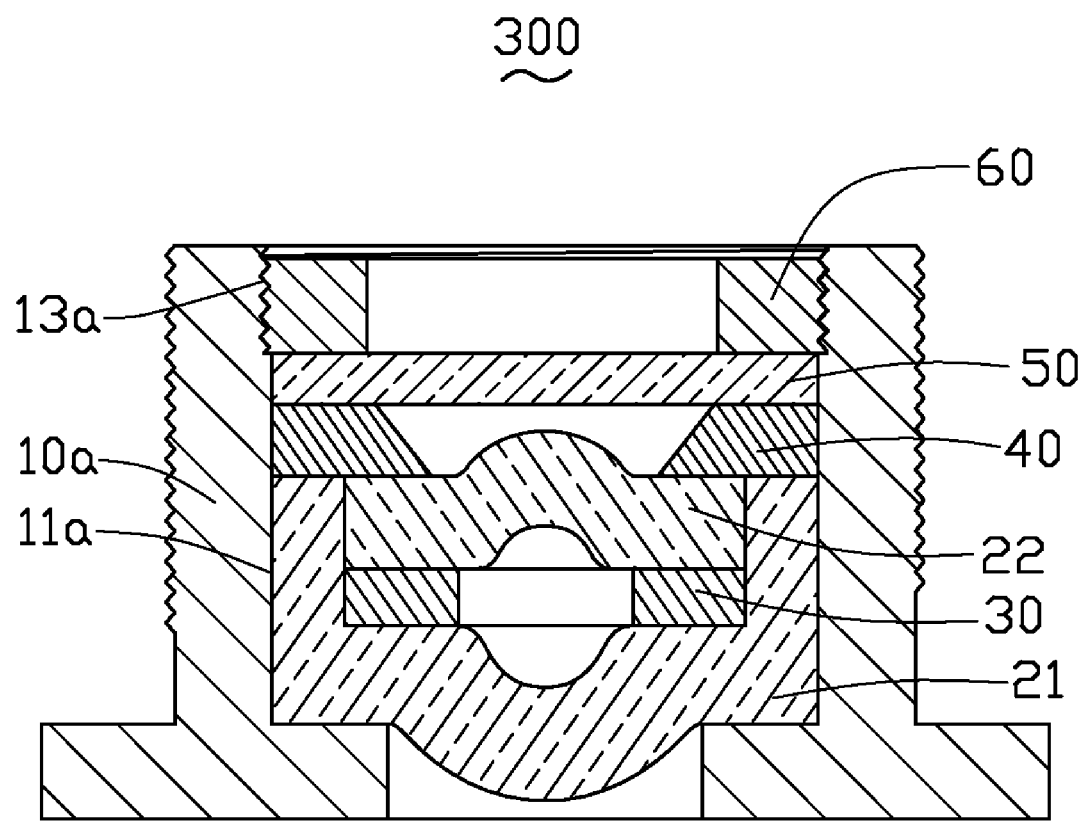
FIG. 4 is an assembled view of a lens module according to a third preferred embodiment of the present invention.

FIG. 4 shows an exemplary lens module 300 according to a third preferred embodiment. The lens module 300 is essentially similar to the lens module 100 illustrated in the first preferred embodiment, however, the retaining portion 12 is omitted, and the barrel 11a has an interior space 11a and a threaded portion 13a proximate to the interior space 11a. The first lens 21, the second lens 22, the aperture member 30, the spacer 40, and the filter 50 are overlaid in the interior spacer 11a; and the ring-shaped fastening member 60 is threadedly engaged in the threaded portion 13a and contacts the filter 50, thereby fastening all of the above mentioned elements in the interior space 11a of the barrel 10.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A lens module comprising:
    a barrel having an interior space defined therein, a retaining portion proximate to the interior space, and a threaded portion proximate to the retaining portion;
    a first lens and a second lens received in the interior space of the barrel;
    an aperture member disposed between the first lens and the second lens;
    a filter received in the retaining portion of the barrel; and
    a ring-shaped fastening member having threads on an outer wall thereof, the fastening member being threadedly engaged in the threaded portion of the barrel and in contact with the filter so as to fasten the filter to the retaining portion of the barrel.

2. The lens module as described in claim 1, wherein an inner diameter of the retaining portion is larger than that of the interior space.

3. The lens module as described in claim 1, wherein the filter is selected from the group consisting of IR cut filters, UV cut filters and UV-IR cut filters.

4. The lens module as described in claim 1, wherein an adhesive is applied between the threaded portion of the barrel and the outer wall of the fastening member.

5. A lens module comprising:
    a barrel having an interior space defined therein, a retaining portion proximate to the interior space, and a threaded portion proximate to the retaining portion, the interior space having a constant inner diameter, an inner diameter of the retaining portion being larger than that of the interior space;
    a first lens and a second lens received in the interior space of the barrel;
    an aperture member disposed between the first lens and the second lens;
    a filter received in the retaining portion of the barrel; and
    a ring-shaped fastening member having threads on an outer wall thereof, the fastening member being threadedly engaged in the threaded portion of the barrel so as to fasten the filter to the retaining portion of the barrel.

6. The lens module as described in claim 5, wherein an adhesive is applied between the threaded portion of the barrel and the outer wall of the fastening member.

* * * * *